(12) United States Patent
Tamanuki et al.

(10) Patent No.: US 8,740,370 B2
(45) Date of Patent: Jun. 3, 2014

(54) LIQUID COMPOSITION, SET, LIQUID CARTRIDGE, INKJET RECORDING METHOD, AND INKJET RECORDING APPARATUS

(75) Inventors: Yukako Tamanuki, Tokyo (JP); Shin-ichi Hakamada, Kawasaki (JP); Tomohiro Yamashita, Yokohama (JP); Yasuhito Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 867 days.

(21) Appl. No.: 12/874,964

(22) Filed: Sep. 2, 2010

(65) Prior Publication Data

US 2011/0057994 A1 Mar. 10, 2011

(30) Foreign Application Priority Data

Sep. 10, 2009 (JP) ................................. 2009-209536
Sep. 10, 2009 (JP) ................................. 2009-209537

(51) Int. Cl.
   *C09D 11/00* (2014.01)
(52) U.S. Cl.
   USPC ........................................................ 347/100
(58) Field of Classification Search
   USPC ........................................................ 347/100
   See application file for complete search history.

(56) References Cited

U.S. PATENT DOCUMENTS

| | | | |
|---|---|---|---|
| 2002/0005885 A1* | 1/2002 | Katsuragi et al. | 347/100 |
| 2002/0069789 A1 | 6/2002 | Katsuragi | |
| 2006/0203055 A1* | 9/2006 | Doi | 347/96 |
| 2008/0055385 A1 | 3/2008 | Houjou | |

FOREIGN PATENT DOCUMENTS

| | | |
|---|---|---|
| CN | 1181399 A | 5/1998 |
| CN | 1320667 A | 11/2001 |
| CN | 1373795 A | 10/2002 |
| EP | 509688 A1 | 10/1992 |
| JP | 2002-172847 A | 6/2002 |

\* cited by examiner

*Primary Examiner* — Laura Martin
(74) *Attorney, Agent, or Firm* — Canon U.S.A., Inc., IP Division

(57) ABSTRACT

A liquid composition used in combination with an ink containing a coloring material is ejected by the action of thermal energy from a recording head including a heating resistor having a protecting layer that is to come into contact with the liquid composition and that contains at least one of a metal and a metal oxide. The liquid composition contains at least either an organic compound having a carboxy group and an amino group or an amine oxide compound, an organic acid having a carboxy group, and water.

13 Claims, No Drawings

LIQUID COMPOSITION, SET, LIQUID CARTRIDGE, INKJET RECORDING METHOD, AND INKJET RECORDING APPARATUS

BACKGROUND OF THE INVENTION

1. Field of the Invention

The present invention relates to a liquid composition, a set, a liquid cartridge, an inkjet recording method and an inkjet recording apparatus.

2. Description of the Related Art

A liquid-liquid reaction system using an organic acid has been studied for an inkjet recording method. In the liquid-liquid reaction system using an organic acid, a liquid composition containing an organic acid is brought into contact with an ink containing a coloring material that can aggregate under acid conditions, on a recording medium for recording. When the ink comes into contact with the liquid composition, the pH of the ink is changed to acid, so that the coloring material aggregates. It has been known that if a liquid composition whose pH has been adjusted with a strong base, such as potassium hydroxide, is repeatedly ejected by the action of thermal energy in this system, ejection failure may occur. This is because the strong base dissolves a metal and/or metal oxide, such as tantalum and/or tantalum oxide, in the protecting layer of a heating resistor and thus erodes the protecting layer.

In order to prevent the erosion of the protecting layer caused by polyvalent metal ions in a liquid composition ejected by the action of thermal energy, Japanese Patent Laid-Open No. 2002-172847 proposes a method in which a sulfonic acid containing an amino group, such as taurine, is added to the liquid composition.

The present inventors however have found that if the method of the above-cited patent document is applied to a liquid-liquid reaction system using an organic acid, it is very difficult to prevent the erosion of the protecting layer of the heating resistor while satisfying the image quality required in recent years.

SUMMARY OF THE INVENTION

According to an aspect of the invention, there is provided a liquid composition used in combination with an ink containing a coloring material, ejected by the action of thermal energy from a recording head including a heating resistor having a protecting layer that contains at least one of a metal and a metal oxide and that is to come into contact with the liquid composition. The liquid composition contains at least either an organic compound having a carboxy group and an amino group or an amine oxide compound, an organic acid having a carboxy group, and water.

Further features of the present invention will become apparent from the following description of exemplary embodiments.

DESCRIPTION OF THE EMBODIMENTS

Aspects of the present invention will be further described using exemplary embodiments. In the following description, the liquid composition containing an organic compound or an organic acid may be expressed as that "containing ions" because the organic compound or organic acid is dissociated in the liquid composition.

A mechanism of erosion of the protecting layer from the heating resistor will first be described in detail. When a liquid composition containing an organic acid having a carboxy group and a strong base, such as potassium hydroxide, is heated, the following phenomenon occurs in the liquid composition around the protecting layer. Specifically, part of the organic acid having a carboxy group in the liquid composition around the protecting layer may be decomposed by the heat of the heating resistor, or may be dehydrated within its molecule or among the molecules. For example, glutaric acid, which is an organic acid having carboxy groups, is condensed into glutaric acid anhydride by dehydration between the carboxy groups within the molecule at a temperature of about 150° C., lower than or equal to the maximum temperature of the heating resistor. Consequently, the acid to be neutralized by the strong base is lost. Accordingly, an excess of alkali metal ions derived from the strong base, such as potassium hydroxide, not used for neutralization is generated around the protecting layer of the heating resistor. It is supposed that the excess of alkali metal ions dissolves at least either metals or metal oxides contained in the protecting layer of the heating resistor, such as tantalum or tantalum oxide, and thus erodes the protecting layer.

When a liquid composition containing a sulfonic acid having an amino group, such as taurine, is used, the method disclosed in the above-cited patent document can prevent the erosion of the protecting layer, but cannot satisfy the image quality required in recent years, as mentioned above. A reason for this is as below: In order to suppress efficiently the dissolution of at least either the metal or the metal oxide in the protecting layer of the heating resistor, a considerably large amount of taurine must be added to the liquid composition. Unfortunately, sulfonic acids having an amino acid, such as taurine, generally have low solubilities in water while the solubility of the sulfonic acid having an amino group must be increased for suppressing the dissolution of the protecting layer of the heating resistor. For example, the organic acid content in the liquid composition may be reduced, or the solvent content in the composition may be reduced to increase the water content. If the organic acid content is reduced, however, high quality images (having a high optical density) cannot be sufficiently produced. If the solvent content is also reduced, sticking resistance cannot be satisfied. In the known method, it is thus very difficult to prevent the erosion of the protecting layer from the heating resistor while satisfying image quality required in recent years.

Accordingly, the present inventors have examined a system for adjusting the pH using a compound that does not cause the erosion of the protecting layer of the heating resistor, instead of a strong base that would erode the protecting layer, such as potassium hydroxide.

The inventors first examined triethanolamine and ammonia, which are weak bases. However, an excess of the base around the protecting layer of the heating resistor caused the erosion of the protecting layer due to the same mechanism as in the case where a strong base, such as potassium hydroxide, is added.

The present inventors examined the use of disodium hydrogenphosphate, which is an organic compound nearly neutral in pH in aqueous solution. In this case, however, the protecting layer of the heating resistor was eroded. A reason for this can be explained as below: The disodium hydrogenphosphate is heated to decompose at a temperature lower than or equal to the maximum temperature of the heating resistor, and an alkali metal salt, that is, a sodium salt, is isolated in the liquid composition around the protecting layer of the heating resistor. Probably, the hydroxide ions isolated from the alkali metal salt and water molecules dissolve at least one of the metal and metal oxide contained in the protecting layer of the heating resistor, such as tantalum or tantalum oxide, and thus erode the protecting layer.

Accordingly, the present inventors hypothesized that the erosion of the protecting layer could be prevented by use of a compound that is nearly neutral in pH in aqueous solution and does not isolate an alkali metal salt even if it is decomposed by heating around the heating resistor. The present inventors have continued the examination for such compounds. As a result it was found that by adding at least either an organic compound having a carboxy group and an amino group or an amine oxide compound to the liquid composition, the erosion of the protecting layer of the heating resistor can be prevented while high optical density can be achieved. In other words, it has become possible that the erosion of the protecting layer is prevented with a high optical density ensured, which is impossible in the method in which an organic acid and a sulfonic acid having an amino group, such as taurine, are used. A reason for this can be explained as below:

The description here will discuss liquid composition 1 containing only an organic acid having a carboxy group as a reaction agent, liquid composition 2 containing only an organic acid having a carboxy group and an amino group as reaction agents, and liquid composition 3 containing an amine oxide compound. Liquid composition 1 contains an organic acid having a carboxy group (which hereinafter may be referred to as carboxy group-containing organic acid) having an acid buffer capacity. The acid buffer capacity controls the pH of the mixture of the liquid composition and an ink to a range in which the coloring material can easily aggregate, thus aggregating the coloring material. In liquid compositions 2 and 3, the organic compound having a carboxy group and an amino group and the amine oxide compound cause equilibrium reactions expressed by the following equations (1) and (2), respectively; hence, the liquid compositions each contain a cation. In liquid compositions 2 and 3, the cation and the coloring material cause cation/anion electrostatic interaction. This electrostatic interaction aggregates the coloring material.

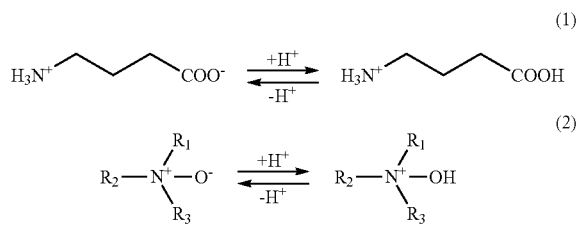

In the use of liquid composition 1, the entire system containing the coloring material turns acid, so that the coloring material aggregates. Accordingly, the aggregation point can exist in the entirety of the mixture. On the other hand, in the use of liquid composition 2 or 3, the cation of the organic compound having a carboxy group and an amino group or the cation of the amine oxide compound acts as the aggregation point. Hence, liquid composition 1 more easily causes the coloring material to aggregate than liquid compositions 2 and 3. Accordingly, it may be that liquid composition 1 can aggregate the coloring material in the mixture faster than liquid compositions 2 and 3.

If a liquid composition (liquid composition 4) contains two reaction agents that aggregate the coloring material at different speeds, that is, an organic acid having a carboxy group and at least either an organic compound having a carboxy group and an amino group or an amine oxide compound, the respective reaction agents and the coloring material interact with one another to form an aggregate of the coloring material. The present inventors hypothesize that at least one of the following phenomena (1) to (3) that can occur in the course of aggregation provides an optical density higher than the optical density resulting when either of the two reaction agents is singly used.

(1) When the liquid composition and an ink containing a coloring material are mixed on a recording medium, the organic acid having a carboxy group and the coloring material are associated by the acid buffer action of the organic acid, in the first reaction stage. Consequently, the coloring material in the ink is immediately associated to separate from the liquid phase. In the second reaction stage, the cation of at least either the organic compound having a carboxy group and an amino group or the amine oxide compound forms a larger aggregate with the association of the coloring material formed in the first reaction stage. Since this aggregate is held on the recording medium rather than penetrating between the fibers of the recording medium, the optical density may increase.

(2) When the liquid composition and an ink containing a coloring material are mixed on a recording medium, the organic acid having a carboxy group, which is the reaction agent having a higher aggregation speed, is associated with the coloring material to form an aggregate by the acid buffer action. The aggregate fills spaces between the fibers of the recording medium, in the first reaction stage. In the second reaction stage, the cation of at least either the organic compound having a carboxy group and an amino group or the amine oxide compound acts to form an aggregate of the coloring material. Since the aggregate of the coloring material formed in the second reaction stage is deposited on the aggregate of the coloring material formed in the first reaction stage, the aggregate formed in the second reaction stage is held on the recording medium rather than penetrating the spaces between the fibers of the recording medium. Thus, the optical density may increase.

(3) The coloring material having come into contact with the cation of at least either the organic compound having a carboxy group and an amino group or the amine oxide compound in the second reaction stage of the above (1) or (2) forms an aggregate while spreading over the recording medium with a gently aggregated state maintained. Since the coloring material is aggregated over a wider region on the recording medium, non-uniformity of the coloring material can be prevented to increase the optical density over the entire image.

The present inventors found that the above phenomena (1) to (3) can occur efficiently when the carboxy group-containing organic acid content in the liquid composition is 3.0% or more and 15.0% or less by mass relative to the total mass of the liquid composition. A reason for this can be explained as below:

A content of less than 3.0% by mass of carboxy group-containing organic acid does not exhibit a sufficient acid buffer capacity because of a small amount of carboxy group, and consequently cannot sufficiently produce the effect of increasing the optical density. In contrast, a content of more than 15.0% by mass of carboxy group-containing organic acid causes a large part of the coloring material to aggregate locally because of an excessive acid buffer capacity of the organic acid. Consequently, non-uniformity can occur, so that a sufficient optical density may not be obtained. Therefore, when the carboxy group-containing organic acid content is outside the above range, the organic compound having a carboxy group and an amino group or the amine oxide compound preferentially aggregates the coloring material even if the liquid composition contains the carboxy group-containing organic acid and at least either the organic compound having a carboxy group and an amino group or the amine oxide compound. Consequently, it becomes probably difficult that the two reaction agents interact efficiently with each other as described in the above (1) to (3).

In addition, the present inventors found that it is advantageous that the pH of the liquid composition is controlled to 5.5 or less in view of the state of the coloring material in contact with the liquid composition. This is because the equilibrium reaction between the amine oxide compound and the organic compound having a carboxy group and an amino group proceeds in the direction in which the cation is produced (toward the right in chemical equations (1) and (2)), thus supplying the cation to the system effectively. The optical density and uniformity of images were particularly increased by efficiently supplying cations. On the other hand, if the pH of the liquid composition is too low, a component of the inkjet recording apparatus may corrode. It thus may be that the liquid composition has a pH of 3.5 or more. The pH of the liquid composition mentioned herein is a value at 25° C., and can be measured with a normal pH meter. In the Examples described later, the pH was measured at 25° C. with a pH meter (model: F-21, manufactured by Horiba).

When the carboxy group-containing organic acid content is 3.0% or more and 15.0% or less by mass relative to the total mass of the liquid composition, and when the pH of the liquid composition is 3.5 or more and 5.5 or less, a much higher optical density than that hypothesized can be obtained.

Liquid Composition

Constituents of the liquid composition will now be described. The liquid composition may be colorless, milky-white or white so as not to affect images recorded with the ink. In particular, it may be that the liquid composition shows an absorption spectrum not having a peak in the range of 400 nm to 800 nm when it is diluted to 50 times (on a mass basis) with water. According to one aspect, such a liquid composition may not contain a coloring material.

Carboxy Group-Containing Organic Acid

The organic acid mentioned herein refers to an organic compound with acidic properties. A carboxy group-containing organic acid used in the liquid composition of an embodiment of the invention can be a compound whose alkyl chain, not including the carbon of the carboxy group, has a carbon number of 3 or less. Such an organic acid is superior in solubility in water. Examples of the carboxy-group containing organic acid include monocarboxylic acids, such as formic acid, acetic acid, propionic acid, and butyric acid; dicarboxylic acids such as oxalic acid, malonic acid, succinic acid, and glutaric acid; and hydroxycarboxylic acids, such as malic acid and tartaric acid. The carboxy group-containing organic acid used in the liquid composition does not have an amino group. Hence, the carboxy group-containing organic acid is different from the organic compound having a carboxy group and an amino group.

From the viewpoint of easy aggregation of the coloring material, dicarboxylic acids may be more suitable than monocarboxylic acids. The reason is not clear, but can be at least partially explained as below. Probably, the higher the ratio of the molar concentration of the carboxy group to the molar concentration of the coloring material at the time when the carboxy group-containing organic acid comes in contact with a coloring material, the higher the acid buffer capacity. Accordingly, as the molar concentration ratio of the carboxy group to the coloring material is increased, the aggregation of the coloring material by an acid is further promoted. It is therefore hypothesized that the reactivity can be enhanced by increasing the number of carboxy groups in a molecule. However, a trivalent or higher carboxylic acid, such as citric acid, may be less soluble in water, and, therefore, dicarboxylic acids can be advantageously used.

The carboxy group-containing organic acid used in the liquid composition is generally a weak acid, and the strength of the acid can be represented by an acid dissociation constant (pKa). The pKa value of the carboxy group-containing organic acid may be 2.5 or more and 6.5 or less in water at 25° C. from the viewpoint of aggregating the coloring material effectively. A carboxy group-containing organic acid with a pKa of less than 2.5 has a high acidity, and may corrode a component or member of the inkjet recording apparatus. In contrast, a carboxy group-containing organic acid with a pKa of more than 6.5 has a low acidity, and cannot aggregate the coloring material sufficiently to obtain a sufficient optical density. A divalent or higher carboxylic acid shows a plurality of stages of electrolytic dissociation according to the number of carboxy groups corresponding to the valence, and has a plurality of acid dissociation constants pKa. If the carboxy group-containing organic acid has a plurality of pKa values, it may be the case that all the pKa values are in the above range. The pKa mentioned herein is a value measured by potentiometric titration using 0.1 mol/L aqueous solution of sodium hydroxide.

Organic Compound Having a Carboxy Group and an Amino Group

An organic compound having a carboxy group and an amino group used in the liquid composition of an embodiment of the invention can be a compound whose alkyl chain not including the carbon of the carboxy group has a carbon number of 5 or less. Such an organic compound is superior in solubility in water. Examples of such an organic compound include glycine, β-alanine, 4-aminobutyric acid, 5-aminovaleric acid, and 6-aminohexanoic acid.

According to the study of the present inventors, the use of 4-aminobutyric acid can achieve a particularly high optical density. The reason can be explained as below: The acid dissociation constant pKa1 of the first proton of 4-aminobutyric acid is about 4.0, and 4-aminobutyric acid has a pH that can adjust the pH of the liquid composition in a suitable range. In a liquid composition having an adjusted pH and containing 4-aminobutyric acid, therefore, the 4-aminobutyric acid has not only properties of a cationic compound, but also a buffer action. Thus, 4-aminobutyric acid contributes to aggregation of a pigment by an acid when the liquid composition comes into contact with an ink. It is therefore thought that a particularly high optical density can be achieved.

The organic compound having a carboxy group and an amino group is added to adjust the pH of the liquid composition in a suitable range. The content of the organic compound having a carboxy group and an amino group can be 0.1% or more and 30.0% or less by mass relative to the total mass of the liquid composition. According to one aspect, it may be 0.1% or more and 7.0% or less by mass.

Amine Oxide Compound

The amine oxide compound used in the liquid composition of an embodiment of the invention is expressed by the following general formula (I):

$R_1$, $R_2$ and $R_3$ each represent an atom or a group selected from the group consisting of hydrogen, alkyl, alkenyl, alkynyl, aralkyl, aryl and heteroaryl, and these groups may be further substituted. $R_1$, $R_2$ and $N^+$ may form a five-membered or six-membered heterocycle, and the heterocycle may be further substituted.

$R_1$, $R_2$ and $R_3$ can be independently hydrogen, an alkyl group having a carbon number of 1 to 6, an alkenyl group having a carbon number of 1 to 6, an alkynyl group having a carbon of 1 to 6, an aralkyl group having a carbon number of 7 to 11, an aryl group having a carbon of 6 to 10, or a heteroaryl group having a carbon number of 3 to 10, from the viewpoint of the solubility in water of the compound. These groups may further have a substituent selected from the group consisting of halogens, alkyl groups having a carbon number of 1 to 6, alkoxy groups having a carbon of 1 to 6, alkoxycarbonyl groups having a carbon number of 1 to 6, and the nitro group.

$R_1$, $R_2$ and $N^+$ may form a five-membered or six-membered heterocycle. Examples of the five-membered heterocycle include pyrrole, pyrazole, imidazole, thiazole, isothiazole, thiadiazole, oxazole, isoxazole, and pyrroline. Examples of the six-membered heterocycle include pyridine, pyridazine, pyrimidine, pyrazine, piperidine, piperazine, and morpholine. From the viewpoint of stability of the amine oxide compound, the pyridine ring or the morpholine ring can be selected. These rings may further have an above-cited substituents.

Examples of the amine oxide compound include N,N-dimethylbutylammonium-N-oxide; N,N,N-trimethylammonium-N-oxide; morpholine-N-oxide compounds, such as N-methylmorpholine-N-oxide and N-ethylmorpholine-N-oxide; and pyridine-N-oxide compounds, such as pyridine-N-oxide, 4-(dimethylamino)pyridine-N-oxide, and 2,6-dimethylpyridine-N-oxide.

In one embodiment of the present invention, as described above, the equilibrium reaction of the amine oxide compound, producing a cation, not only prevents the erosion of the protecting layer of the heating resistor, but also produces the effect of achieving a high optical density. Hence, any compound expressed by general formula (I) can be used in the liquid composition effectively, as long as the compound can come into the equilibrium reaction expressed by formula (2) producing a cation.

According to the detailed study of the present inventors, the use of morpholine-N-oxide compounds, more specifically the use of N-methylmorpholine-N-oxide, can achieve particularly high optical density. The reason can be explained as below: Morpholine-N-oxide compounds have pKa values of about 4.5, and have pH that can adjust the liquid composition in a suitable range. In a liquid composition having an adjusted pH and containing a morpholine-N-oxide compound, therefore, the morpholine-N-oxide compound has not only properties of a cationic compound, but also a buffer action. Thus, the morpholine-N-oxide compound contributes to aggregation of a pigment by an acid when the liquid composition comes into contact with an ink. It is therefore hypothesized that a particularly high optical density can be achieved. Among the morpholine-N-oxide compounds, N-methylmorpholine-N-oxide has a particularly high solubility in water, and is therefore advantageously used.

The amine oxide compound is added to adjust the pH of the liquid composition in a suitable range. The content of the amine oxide compound can be 0.3% or more and 15.1% or less by mass relative to the total mass of the liquid composition.

Aqueous Medium

The liquid composition according to an embodiment of the present invention may contain water or an aqueous medium being a mixture of water and a water-soluble organic solvent. Deionized water (ion exchanged water) can be suitably used. The water content in the liquid composition can be 50.0% or more and 95.0% or less by mass relative to the total mass of the liquid composition.

The water-soluble organic solvent content in the liquid composition can be 3.0% or more and 50.0% or less by mass relative to the total mass of the liquid composition. Any water-soluble organic solvent generally used in liquids for the inkjet recording method can be used. Examples of the water-soluble organic solvent include alkyl alcohols having a carbon number in the range of 1 to 4, amide compounds, ketones and keto-alcohols, ethers, polyalkylene glycols, glycols, alkylene glycols containing an alkylene group having a carbon number of 2 to 6, alkyl ether acetates, alkyl ethers derived from polyhydric alcohols, and nitrogen-containing compounds. These water-soluble organic solvent may be used singly or in combination.

Other Constituents

The liquid composition may further contain a water-soluble organic compound that is solid at room temperature, such as urea, urea derivatives, trimethylolpropane, or trimethylolethane. In addition, other additives, such as surfactant, pH adjuster, rust preventive, preservative, fungicide, antioxidant, and antireductant, may optionally be added so that the liquid composition has suitable properties.

Ink

Ink Coloring Material

The coloring material in an ink used in combination with the liquid composition will now be described. The coloring material can be at least either a dye or a pigment. In an embodiment of the invention, a pigment may be advantageously used because of its fastness or other properties. Both a pigment and a dye may be used in combination. The coloring material content is suitably 0.1% or more and 15.0% or less by mass, such as 1.0% or more and 10.0% or less by mass, relative to the total mass of the ink.

Dye

The dye may be selected from the known dyes without particular limitation. Examples of the dye include direct dyes, acid dyes, basic dyes, disperse dyes, and food dyes. A dye that aggregates when the liquid composition and the ink are mixed may be selected.

Pigment

The pigment may be selected from the known inorganic pigments and organic pigments without particular limitation. The pigment may be of polymer-dispersion type that is dispersed using a polymer as a dispersant (polymer-dispersion pigment using a polymeric dispersant, microencapsulated pigment composed of particles whose surfaces are coated with a polymer, or polymer-bonded self-dispersing pigment composed of pigment particles having an organic group, including a polymer, chemically bonded to the surfaces) or of self-dispersing type whose particles have hydrophilic groups at the surfaces (self-dispersing pigment). Two or more pigments different in dispersion method may be used in combination.

Dispersant

If a pigment is used as the coloring material of the ink, a polymer-dispersion pigment can be advantageously used. In this instance, the dispersant can be a substance whose anionic group acts to disperse the pigment stably in an aqueous medium. Any polymer used in the known inks can be used as the dispersant. The polystyrene-equivalent weight average molecular weight of the dispersant may be 1,000 or more and 30,000 or less, such as 3,000 or more and 15,000 or less, wherein the polystyrene-equivalent weight average molecular weight is measured by gel permeation chromatography (GPC). The acid value of the polymer used as the dispersant may be 50.0 mg KOH/g or more and 300.0 mg KOH/g or less. According to one aspect, the acid value may be 100.0 mg KOH/g or more and 150.0 mg KOH/g or less.

Aqueous Medium and Other Constituents

The ink may contain water or an aqueous medium being a mixture of water and a water-soluble organic solvent. The water-soluble organic solvent content in the ink can be 3.0% or more and 50.0% or less by mass relative to the total mass of the ink. The water-soluble organic solvents cited above as those used in the liquid composition can be used in the ink. Deionized water (ion exchanged water) can be suitably used. The water content in the ink may be 50.0% or more and 95.0% or less by mass relative to the total mass of the ink. The ink may contain some of the other constituents cited as additives used in the liquid composition.

Set of Liquid Composition and Ink

The liquid composition according to an embodiment of the invention can be used as a set in combination with the ink containing a coloring material. The set is in a state where the liquid composition of an embodiment of the invention and color inks, such as cyan, magenta, yellow, red, green, blue, and black, are used together. The ink to be combined into the set is not particularly limited, as long as the set includes at least one ink that can aggregate when it is mixed with the liquid composition. The set according to an embodiment of the invention may be one body into which a plurality of liquid cartridges are integrated, a group including a plurality of separate liquid cartridges, or a unit including liquid cartridges and a recording head.

Inkjet Recording Method

The inkjet recording method according to an embodiment of the invention includes the step of ejecting a liquid composition by the action of thermal energy. More specifically, the inkjet recording method can include two steps: step A of ejecting a liquid composition from a recording head onto a recording medium by the action of thermal energy; and step B of applying an ink onto the recording medium. Step A may be performed before step B, or step B may precede.

Liquid Cartridge

The liquid cartridge according to an embodiment of the present invention includes a storage portion in which the liquid composition of an embodiment of the invention is accommodated.

Recording Unit

A recording unit suitably used for recording with the liquid composition of embodiments of the invention includes a thermal inkjet recording head having a heating resistor generating a thermal energy for ejecting the liquid composition from an ejection orifice, and a storage portion in which the liquid composition is accommodated. The heating resistor has a protecting layer containing at least one of a metal and a metal oxide on its surface coming into contact with the liquid composition. Examples of the metal or metal oxide include metals, such as Ta, Zr, Ti, Ni, Al, and W, and their metal oxides. The recording unit of an embodiment of the invention can be a unit into which the liquid cartridge and the recording head are integrated.

Inkjet Recording Apparatus

The inkjet recording apparatus according to an embodiment of the invention includes a thermal inkjet recording head having a heating resistor generating a thermal energy for ejecting a liquid composition, and a storage portion in which the liquid composition is accommodated. The recording head may include a recording element having a line of liquid composition ejection orifices and a line of ink ejection orifices, or may include recording elements, each having either a line of liquid composition ejection orifices or a line of ink ejection orifices. From the viewpoint of the reliability of the ink and liquid composition, for example, from the viewpoint of preventing sticking, the latter structure may be advantageous, because the recording elements of a general inkjet recording apparatus are each provided with a cap for capping. If the liquid cartridge has a structure applying a negative pressure to the recording head, the liquid cartridge may have the following structure. An absorber may be provided in the storage portion of the liquid cartridge, or the cartridge may include a flexible storage bag and a spring portion applying a pressing force to the storage bag in a direction in which the inner volume of the storage bag can be expanded.

EXAMPLES

Aspects of the invention will further be described in detail with reference to the following Examples and Comparative Examples. However, the invention is not limited to the Examples unless departing from the scope and spirit of the invention. In the following description, "%" and "part(s)" used in the description of preparation of pigment-dispersed liquids, inks, and liquid compositions are on a mass basis unless otherwise specified.

Preparation of Pigment-Dispersed Liquid

A pigment (carbon black)-dispersed liquid was prepared according to the following procedure: A carbon black pigment-dispersed liquid (pigment content: 15.0%; polymer content: 7.5%; volume average particle size: 105 nm) was prepared by mixing 37.5 parts of polymer aqueous solution containing 20.0% of styrene-(n-butyl acrylate)-acrylic acid polymer (compositional molar ratio: 33:44:23; weight average molecular weight: 5,000; acid value: 120.2 mg KOH/g) neutralized with 1 equivalent of potassium hydroxide (KOH), 15.0 parts of carbon black, and 47.5 parts of water in a ball mill with zirconia beads.

Preparation of Ink

The resulting carbon black pigment-dispersed liquid and other constituents shown below were mixed and stirred sufficiently. The mixture was subjected to pressure filtration through a cellulose acetate filter having a pore size of 1.2 µm (manufactured by Advantec) to yield an ink. The ink was combined into a set with a liquid composition prepared as below.

Pigment-dispersed liquid: 20.0%
Polyethylene glycol 600: 9.0%
Glycerol: 6.0%
Acetylenol E 100 (produced by Kawaken Fine Chemical): 1.0%
Water: 64.0%

Preparation of Liquid Compositions

Compositions of Examples and Comparative Examples were prepared by sufficiently mixing and stirring the constituents according to Tables 1 to 4. Each mixture was subjected to pressure filtration through a cellulose acetate filter having a pore size of 0.45 µm (manufactured by Advantec) to yield a liquid composition. The pH of the resulting liquid composition was measured at 25° C. with a pH meter F-21 manufactured by Horiba. Acetylenol E 100 shown in the Tables is a surfactant produced by Kawaken Fine Chemical.

In measurement of absorbance of 50-time diluted liquid compositions (on a mass basis), each liquid composition of the Examples did not exhibit a peak in the range of 400 nm to 800 nm.

Evaluation

Erosion of Protecting Layer

The resulting liquid composition was loaded in an inkjet recording apparatus (product name: PIXUS iP3300, manufactured by Canon) including a recording head ejecting an ink and a liquid composition by the action of thermal energy. Continuous ejection tests were performed under the recording conditions: ejection amount per droplet of 5 pL; ejection frequency of 15,000 Hz; number of ejections of $3.0 \times 10^8$. In the recording head of the inkjet recording apparatus, the protecting layer of the heating resistor is made of tantalum and tantalum oxide. After the continuous test, the section of the protecting layer was observed through a focused ion beam scanning electron microscope (FIB-SEM, model DB235, manufactured by FEI). The remaining thickness of the protecting layer of the heating resistor was calculated from the following equation:

Remaining thickness (%) of protecting layer={(thickness of protecting layer after continuous ejection test)/(thickness of protecting layer before continuous ejection test)}×100

The evaluation criteria were as follows, and the results are shown in Tables 1 to 4. In the evaluation of the Examples, A represents that the results were in a favorable level, and B represents that the results were in an unacceptable level.

A: The remaining thickness of the protecting layer was 50% or more.

B: The remaining thickness of the protecting layer was less than 50%.

Optical Density

The resulting ink and liquid composition were loaded in an inkjet recording apparatus (product name: PIXUS Pro9500, manufactured by Canon) including a recording head ejecting a liquid by the action of thermal energy. In the recording head of the inkjet recording apparatus, the protecting layer of the heating resistor is made of tantalum and tantalum oxide. The recording head had two recording elements so that the liquid composition and the ink could be ejected from respective ejection orifice lines provided to different recording elements. The recording was performed under the following conditions: temperature of 23° C., relative humidity of 55%, recording density of 4,800 dpi×2,400 dpi, and ejection amount of 3.0 pL. An image was formed on a recording medium at an ink recording duty of 150% and a liquid composition recording duty of 50%. In the evaluation, the recording duty of 100% was the condition where four droplets of ink were applied in a unit region of 1/600 dpi×1/600 dpi at a resolution of 600 dpi×600 dpi using an inkjet recording apparatus, wherein the volume per droplet was 3.5 pL. The liquid composition was applied onto a recording medium, and subsequently the ink was applied onto the liquid composition on the recording medium. The resulting recorded matter was dried for 24 hours under conditions of 23° C. in temperature and 55% in relative humidity. The resulting image was used for evaluation.

The optical density of the image formed above was measured. The optical density was measured with a spectrophotometer (product name: Spectrolino, produced by Gretag Macbeth) with a light source of D50, and a viewing angle of 2°. The optical density was evaluated according to the following criteria. The results are shown in Tables 1 to 4. In the evaluation criteria of optical density, AAA to A represent that the results were at favorable levels as the optical density of recorded matter, and B to D represent that the results were at unacceptable levels as the optical density of recorded matter.

AAA: optical density ≥ 1.50
AA: 1.45 ≤ optical density < 1.50
A: 1.40 ≤ optical density < 1.45
B: 1.35 ≤ optical density < 1.40
C: 1.30 ≤ optical density < 1.35
D: optical density < 1.30.

TABLE 1

COMPOSITIONS AND EVALUATION RESULTS OF LIQUID COMPOSITIONS (Unit: %)

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Acetic acid | 2.0 | 0 | 0 | 0 | 0 | 0 | 6.9 | 0 | 0 | 0 |
| Glutaric acid | 0 | 2.0 | 2.0 | 2.0 | 2.0 | 2.0 | 0 | 3.0 | 3.0 | 3.0 |
| 4-Aminobutyric acid | 5.0 | 0.1 | 0.2 | 2.0 | 4.1 | 6.8 | 2.0 | 0.15 | 0.2 | 6.8 |
| Trimethylolpropane | 20.0 | 20.0 | 20.0 | 20.0 | 20.0 | 20.0 | 20.0 | 20.0 | 20.0 | 20.0 |
| Acetylenol E 100 | 0.1 | 0.1 | 0.1 | 0.1 | 0.1 | 0.1 | 0.1 | 0.1 | 0.1 | 0.1 |
| Water | 72.9 | 77.8 | 77.7 | 75.9 | 73.8 | 71.1 | 71.0 | 76.8 | 76.7 | 70.1 |
| pH (*1) | 5.7 | 3.3 | 3.5 | 4.5 | 5.5 | 5.7 | 3.5 | 3.3 | 3.5 | 5.5 |
| Protecting layer erosion | A | A | A | A | A | A | A | A | A | A |
| Optical density | B | A | AA | AA | AA | A | AA | AA | AAA | AAA |

(*1) pH of ink at 25° C.

TABLE 2

COMPOSITIONS AND EVALUATION RESULTS OF LIQUID COMPOSITIONS (Unit: %)

| | Example 11 | Example 12 | Example 13 | Example 14 | Example 15 | Example 16 | Example 17 | Example 18 | Example 19 | Example 20 |
|---|---|---|---|---|---|---|---|---|---|---|
| Acetic acid | 0 | 0 | 0 | 0 | 0 | 2.8 | 0 | 0 | 0 | 0 |
| Glutaric acid | 3.0 | 9.0 | 15.0 | 16.0 | 3.0 | 0 | 2.8 | 2.8 | 2.8 | 2.8 |

TABLE 2-continued

COMPOSITIONS AND EVALUATION RESULTS OF LIQUID COMPOSITIONS (Unit: %)

| | Example 11 | Example 12 | Example 13 | Example 14 | Example 15 | Example 16 | Example 17 | Example 18 | Example 19 | Example 20 |
|---|---|---|---|---|---|---|---|---|---|---|
| 4-Aminobutyric acid | 7.0 | 0.6 | 0.8 | 0.9 | 0 | 0 | 0 | 0 | 0 | 0 |
| β-Alanine | 0 | 0 | 0 | 0 | 0.17 | 0 | 0 | 0 | 0 | 0 |
| NMO | 0 | 0 | 0 | 0 | 0 | 11.1 | 0.3 | 0.5 | 1.0 | 12.2 |
| Trimethylolpropane | 20.0 | 20.0 | 20.0 | 20.0 | 20.0 | 20.0 | 20.0 | 20.0 | 20.0 | 20.0 |
| Acetylenol E 100 | 0.1 | 0.1 | 0.1 | 0.1 | 0.1 | 0.1 | 0.1 | 0.1 | 0.1 | 0.1 |
| Water | 69.9 | 70.3 | 64.1 | 63.0 | 76.7 | 66.0 | 76.8 | 76.6 | 76.1 | 64.9 |
| pH (*1) | 5.7 | 3.5 | 3.5 | 3.5 | 3.5 | 5.7 | 3.3 | 3.5 | 4.5 | 5.5 |
| Protecting layer erosion | A | A | A | A | A | A | A | A | A | A |
| Optical density | AA | AAA | AAA | AA | AA | A | AA | AA | AA | AA |

(*1) pH of ink at 25° C.

TABLE 3

COMPOSITIONS AND EVALUATION RESULTS OF LIQUID COMPOSITIONS (UNIT: %)

| | Example 21 | Example 22 | Example 23 | Example 24 | Example 25 | Example 26 | Example 27 | Example 28 | Example 29 | Example 30 | Example 31 |
|---|---|---|---|---|---|---|---|---|---|---|---|
| Acetic acid | 0 | 6.9 | 0 | 0 | 0 | 0 | 0 | 0 | 0 | 0 | 0 |
| Glutaric acid | 2.8 | 0 | 3.0 | 3.0 | 3.0 | 3.0 | 9.0 | 15.0 | 15.2 | 3.3 | 3.0 |
| 4-aminobutyric acid | 0 | 0 | 0 | 0 | 0 | 0 | 0 | 0 | 0 | 0 | 0.1 |
| NMO | 15.1 | 2.0 | 0.4 | 0.6 | 13.1 | 14.0 | 1.8 | 2.8 | 2.8 | 14.4 | 0.5 |
| Trimethylol-propane | 20.0 | 20.0 | 20.0 | 20.0 | 20.0 | 20.0 | 20.0 | 20.0 | 20.0 | 20.0 | 20.0 |
| Acetylenol E 100 | 0.1 | 0.1 | 0.1 | 0.1 | 0.1 | 0.1 | 0.1 | 0.1 | 0.1 | 0.1 | 0.1 |
| Water | 62.0 | 71.0 | 76.5 | 76.3 | 63.8 | 62.9 | 69.1 | 62.1 | 61.9 | 62.2 | 76.3 |
| pH (*1) | 5.7 | 3.5 | 3.3 | 3.5 | 5.5 | 5.7 | 3.5 | 3.5 | 3.5 | 5.5 | 3.5 |
| Protecting layer erosion | A | A | A | A | A | A | A | A | A | A | A |
| Optical density | AA | AA | AA | AAA | AAA | AA | AAA | AAA | AA | AAA | AAA |

(*1) pH of ink at 25° C.

TABLE 4

COMPOSITIONS AND EVALUATION RESULTS OF LIQUID COMPOSITIONS (UNIT: %)

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| Acetic acid | 2.0 | 0 | 0 | 0 | 0 | 0 | 0 | 2.8 | 0 | 0 |
| Glutaric acid | 0 | 2.0 | 16.0 | 3.0 | 0 | 0 | 3.0 | 0 | 2.8 | 0 |
| 4-Aminobutyric acid | 0 | 0 | 0 | 0 | 6.8 | 8.8 | 0 | 0 | 0 | 0 |
| NMO | 0 | 0 | 0 | 0 | 0 | 0 | 0 | 0 | 0 | 15.1 |
| Methanesulfonic acid | 0 | 0 | 0 | 0 | 0.1 | 0.2 | 0 | 0 | 0 | 15.2 |
| Taurine | 0 | 0 | 0 | 0 | 0 | 0 | 5.6 | 0 | 0 | 0 |
| Trimethylolpropane | 20.0 | 20.0 | 20.0 | 20.0 | 20.0 | 20.0 | 20.0 | 20.0 | 20.0 | 20.0 |
| Acetylenol E 100 | 0.1 | 0.1 | 0.1 | 0.1 | 0.1 | 0.1 | 0.1 | 0.1 | 0.1 | 0.1 |
| Water + pH adjuster (*1) | 77.9 | 77.9 | 63.9 | 76.9 | 73.0 | 70.9 | 71.3 | 77.1 | 77.1 | 49.6 |
| pH (*2) | 4.0 | 4.0 | 4.0 | 3.5 | 5.7 | 5.7 | 3.5 | 5.7 | 5.7 | 5.7 |
| Protecting layer erosion | B | B | B | B | A | A | A | B | B | A |
| Optical density | D | C | A | C | C | C | D | D | C | C |

(*1) pH adjuster: potassium hydroxide
(*2) pH of ink at 25° C.

The pH of the compositions of Comparative Examples 1 to 4 and 7 to 9 was adjusted with potassium hydroxide. Compositions having a pH of less than 3.5 were inferior to compositions having a pH of 3.5 or more in acid resistance to the member of the inkjet recording apparatus coming into contact with the liquid composition. Examples 17 to 21 were at level A in optical density, but Examples 18 to 20 exhibited slightly higher optical density than Examples 17 and 21 and formed more uniform images. Comparative Examples 5 and 6 were at level C in optical density, but Comparative Example 6 exhibited slightly higher optical density than Comparative Example 5.

Thus, aspects of present invention provide a liquid composition that can prevent the protecting layer of a heating resistor from being eroded during continuous ejection, and that can provide high-density images when it is used in combination with an ink containing a coloring material. Furthermore, aspects of the invention can provide a set and a liquid cartridge including the liquid composition, and an inkjet recording method and an inkjet recording apparatus using the liquid composition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-209537 filed Sep. 10, 2009 and No. 2009-209536 filed Sep. 10, 2009, which are hereby incorporated by reference herein in their entirety.

What is claimed is:

1. An inkjet recording method comprising:
   a step of ejecting a liquid composition to a recording medium by the action of thermal energy from a recording head including a heating resistor having a protecting layer that is to come into contact with the liquid composition and that contains at least one of a metal and a metal oxide; and
   a step of applying an ink containing a coloring material to contact with the liquid composition,
   wherein the liquid composition comprises:
   an organic compound having a carboxy group and an amino group;
   an organic acid having a carboxy group, and water, and
   wherein the liquid composition shows an absorption spectrum not having a peak in the range of 400 nm to 800 nm when it is diluted to 50 times on a mass basis with water.

2. The inkjet recording method according to claim 1, wherein the organic acid having the carboxy group comprises a dicarboxylic acid.

3. The inkjet recording method according to claim 1, wherein the pH of the liquid composition is 3.5 or more and 5.5 or less.

4. The inkjet recording method according to claim 1, wherein the content of the organic acid having the carboxy group is 3.0% or more and 15.0% or less by mass relative to the total mass of the liquid composition.

5. The inkjet recording method according to claim 1, wherein the metal comprises tantalum, and the metal oxide comprises tantalum oxide.

6. The inkjet recording method according to claim 1, wherein the step of ejecting a liquid composition is performed before the step of applying the ink.

7. The inkjet recording method according to claim 1, wherein the content of the organic compound having a carboxy group and an amino group is 4.1% or more and 7.0% or less by mass relative to the total mass of the liquid composition.

8. An inkjet recording method comprising:
   a step of ejecting a liquid composition to a recording medium by the action of thermal energy from a recording head including a heating resistor having a protecting layer that is to come into contact with the liquid composition and that contains at least one of a metal and a metal oxide; and
   a step of applying an ink containing a coloring material to contact with the liquid composition,
   wherein the liquid composition comprises an amine oxide compound, an organic acid having a carboxy group, and water, and
   wherein the liquid composition shows an absorption spectrum not having a peak in the range of 400 nm to 800 nm when it is diluted to 50 times on a mass basis with water.

9. The inkjet recording method according to claim 8, wherein the organic acid having the carboxy group comprises a dicarboxylic acid.

10. The inkjet recording method according to claim 8, wherein the pH of the liquid composition is 3.5 or more and 5.5 or less.

11. The inkjet recording method according to claim 8, wherein the content of the organic acid having the carboxy group is 3.0% or more and 15.0% or less by mass relative to the total mass of the liquid composition.

12. The inkjet recording method according to claim 8, wherein the metal comprises tantalum, and the metal oxide comprises tantalum oxide.

13. The inkjet recording method according to claim 8, wherein the step of ejecting a liquid composition is performed before the step of applying the ink.

* * * * *